US012652112B2

(12) United States Patent (10) Patent No.: US 12,652,112 B2
Rahman et al. (45) Date of Patent: Jun. 9, 2026

(54) ARTIFICIAL INTELLIGENCE (AI) AND SOFTWARE DEFINED NETWORK (SDN)-ENABLED QUANTUM SIGNALING ENTANGLEMENT DISTRIBUTION

(71) Applicant: AT&T Intellectual Property I, L.P., Atlanta, GA (US)

(72) Inventors: Moshiur Rahman, Marlboro, NJ (US); Eshrat Huda, Hillsborough, NJ (US); David H. Lu, Irving, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 339 days.

(21) Appl. No.: 18/473,343

(22) Filed: Sep. 25, 2023

(65) Prior Publication Data

US 2025/0233672 A1 Jul. 17, 2025

(51) Int. Cl.
*H04B 10/70* (2013.01)
*G06N 3/0475* (2023.01)

(52) U.S. Cl.
CPC ........... *H04B 10/70* (2013.01); *G06N 3/0475* (2023.01)

(58) Field of Classification Search
CPC .............................. H04B 10/70; G06N 3/0475

USPC ..................................................... 398/39, 140
See application file for complete search history.

(56) References Cited

U.S. PATENT DOCUMENTS

| | | | | |
|---|---|---|---|---|
| 2021/0175976 A1* | 6/2021 | Rahman | ................ | H04L 9/0855 |
| 2021/0176055 A1* | 6/2021 | Rahman | ................ | H04L 9/0855 |
| 2022/0215279 A1* | 7/2022 | Rahman | ................ | G01C 19/72 |
| 2022/0216924 A1* | 7/2022 | Rahman | ................ | G06N 10/00 |
| 2023/0107735 A1* | 4/2023 | Wang | ....................... | H04L 41/16 |
| | | | | 370/235 |
| 2023/0188548 A1* | 6/2023 | Bhaskar | ................ | G06N 10/80 |
| | | | | 726/22 |
| 2023/0327780 A1* | 10/2023 | Bhaskar | ................ | G06N 10/40 |
| | | | | 398/130 |
| 2024/0204887 A1* | 6/2024 | Rijsman | ................ | H04L 9/3297 |
| 2025/0007700 A1* | 1/2025 | Zhang | ................... | H04L 9/0852 |

* cited by examiner

*Primary Examiner* — Li Liu

(74) *Attorney, Agent, or Firm* — Guntin & Gust, PLC; Kenneth S. Kwan

(57) ABSTRACT

Aspects of the subject disclosure may include, for example, receiving artificial intelligence (AI) analytics from a generative AI system, and based on the AI analytics, causing a software defined network (SDN) controller to identify a signaling path over a quantum signaling network, thereby enabling selection of a determined suitable path for quantum entanglement distribution. Other embodiments are disclosed.

20 Claims, 8 Drawing Sheets

200

100

200

RECEIVING ARTIFICIAL INTELLIGENCE (AI) ANALYTICS FROM A GENERATIVE AI SYSTEM — 262

BASED ON THE AI ANALYTICS, CAUSING A SOFTWARE DEFINED NETWORK (SDN) CONTROLLER TO IDENTIFY A SIGNALING PATH OVER A QUANTUM SIGNALING NETWORK, THEREBY ENABLING SELECTION OF A DETERMINED SUITABLE PATH FOR QUANTUM ENTANGLEMENT DISTRIBUTION — 264

<u>260</u>

300

600

ARTIFICIAL INTELLIGENCE (AI) AND SOFTWARE DEFINED NETWORK (SDN)-ENABLED QUANTUM SIGNALING ENTANGLEMENT DISTRIBUTION

FIELD OF THE DISCLOSURE

The subject disclosure relates to artificial intelligence (AI) and software defined network (SDN)-enabled quantum signaling entanglement distribution.

BACKGROUND

Quantum computing is a rapidly-developing technology that leverages the laws of quantum mechanics to perform calculations and solve problems. The computational speeds offered by quantum computing are orders of magnitude greater than those of conventional machines. A quantum computer is composed of certain materials that are kept at very low temperatures, such that electrons therein, for instance, behave as superconductors (moving through the materials with no resistance). This enables precise control of the electrons by using microwave photons to fixate or alter them, and allows for readouts of their positions for information. Whereas a classical processor operates using binary bits, a quantum computer operates using qubits. Qubits can be placed in superposition to create multi-dimensional spaces that support the use of multi-dimensional quantum algorithms to solve complex problems. Qubits can also be entangled with one another such that the behavior of one qubit directly "impacts" another.

Quantum teleportation is the communication functionality that allows the "transmission" of qubits without actually physically transferring the particle that stores the qubits. To implement quantum teleportation, a pair of parallel resources is needed—i.e., two classical bits must be sent from the source to the destination and an entangled pair of qubits must be generated and shared between the source and the destination. Because of this, quantum teleportation involves two parallel communication links—a classical one for transmitting the two classical bits and a quantum one for entanglement generation and distribution.

Quantum networks consist of quantum computers (or nodes) and quantum channels that link the nodes together. A quantum network needs to be capable of distributing entanglement signaling or quantum link setup messages (via generation of entangled qubit Einstein-Podolsky-Rosen (EPR) pairs) among different nodes such that the nodes are quantum-wise "connected." The quantum connection be made over any suitable channel, such as fiber, open air (e.g., satellite), etc. Connected quantum nodes allows for the physical implementation of various quantum-based functionalities, including, but not limited to quantum cryptography, quantum secret sharing, distributed quantum computations (QCs), Internet quantum networking, and so on.

BRIEF DESCRIPTION OF THE DRAWINGS

Reference will now be made to the accompanying drawings, which are not necessarily drawn to scale, and wherein.

DETAILED DESCRIPTION

Figure 1:
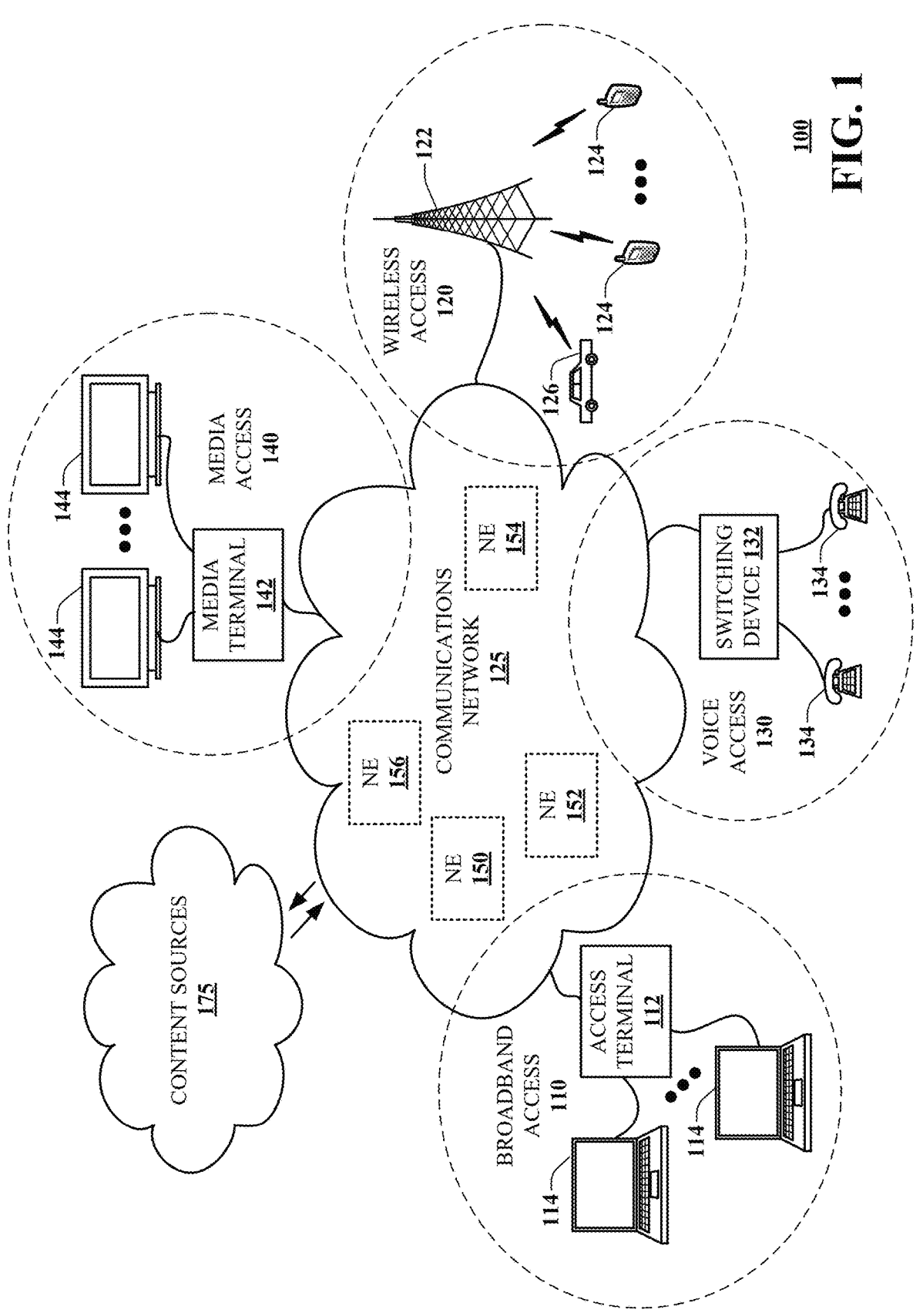
FIG. 1 is a block diagram illustrating an exemplary, non-limiting embodiment of a communications network in accordance with various aspects described herein.

The computing power of a quantum computer scales exponentially with the number of qubits that can be embedded and interconnected within. As briefly discussed above, a quantum network is generally set up by configuring quantum connections via entanglement distribution—i.e., the signaling that links two or more quantum entanglement nodes (QENs) with one another for facilitating quantum-based communications.

The subject disclosure describes, among other things, illustrative embodiments of artificial intelligence (AI) and software defined network (SDN)-enabled quantum signaling in which a core network's SDN controller is capable of leveraging data from generative AI to control an out-of-band quantum signaling (e.g., signaling-only) network.

In exemplary embodiments, an intelligent mediation (IM) platform may function as an advising entity of (or for) the SDN controller, and may utilize AI analytics to resolve or inform the SDN controller's quantum signaling path selection decisions. The quantum signaling network may include a network of networks, such as those based on optical fiber, satellite, or other transport means, and may facilitate out-of-band quantum entanglement distribution among QENs. Out-of-band refers to a quantum channel for setting up a signaling path between quantum nodes—i.e., to set up entanglement between two or more quantum nodes, which can be connected to one another over a fiber connection, satellite connection, etc. The quantum channel is distinct from the later communication channel that may be established between the quantum nodes and used for carrying the "impact" of qubits (or collections of qubits) on one another so as to facilitate data communications across distance. In other words, the quantum signaling network is an out-of-band signaling system in that it operates independently of the voice/data channels used for carrying the actual user information (voice calls, text messages, data, etc.). This is similar to Signaling System 7 (SS7) Integrated Services Digital Network User Part (ISUP) signaling data transport in which trunk(s) for a circuit call are set up between a calling party and a called party, but where a different logical channel is used for the actual voice/data communications between the parties after the connection is established.

In a conventional network, an SDN controller may have access to information (e.g., telemetry data) regarding supported devices on a network and links between those devices, which the SDN controller can use to perform autonomous path selection based on preset conditions. In various embodiments described herein, the SDN controller may be adapted to further control quantum signaling distribution based on information regarding the various quantum-based devices and links therebetween in the network. Preset conditions useful for selecting signaling path may include quantum bit error rate (QBER) reaching a critical value, fiber channel damage (e.g., a lack of connection due to physical fiber damage), high level of losses, warning signal(s) from a compromised or damaged node, signs of eavesdropping, and so on. Based on some or all of these conditions, the SDN controller may determine a suitable or the best (current or future) signaling path (e.g., over fiber, satellite, or other available technology-supported path) for quantum entanglement and signaling distribution between a quantum EPR source node and one or more destination nodes, and may (e.g., by way of the quantum signaling network) instruct the quantum EPR source node to utilize that path for the signaling. In various embodiments, the SDN controller may make the determination in accordance with pre-defined policies and/or real-time network performance data (e.g., regarding data loss, latency, etc.).

As discussed above, the SDN controller may be complemented with generative AI functionality to facilitate the autonomous selection of a current or future (best) quantum network signaling path. The inherent learning capabilities (machine learning algorithms and natural language processing capabilities) of generative AI (e.g., ChatGPT or the like) can be leveraged to transform network management and optimization. In various embodiments, a generative AI system may be configured to analyze vast amounts of data generated by quantum-based (and non-quantum based) network devices and infrastructure, and identify patterns and trends which may not be immediately apparent to or identifiable by human operators or automation entities such as an SDN controller. In this way, the generative AI system may make informed recommendations on how to best allocate resources, balance network loads, and address potential bottlenecks before they become critical issues.

In exemplary embodiments, the SDN controller may perform automatic calculations of optimal paths based on real-time monitoring of link parameters as well as the IM platform's recommendations in accordance with generative AI's actionable intelligence. In some embodiments, the SDN controller may be capable of automatically informing affected network users (e.g., quantum nodes) of detected issues and performing switching using backup channels. In one or more embodiments, the SDN controller may be configured to administer the entire network, backed by the generative AI.

In this way, the IM platform may take input from a generative AI system to determine and provide the SDN controller with the best signaling route recommendation(s) (e.g., over fiber or satellite) for the present or a specified future time. The SDN controller's initial conclusion may thus be mediated with AI-based recommendations, which brings dynamism and more informed decision-making. Pairing generative AI and SDN capabilities for quantum entanglement distribution also provides for more robust, intelligent, and dynamic EPR generation.

In a large-scale quantum computing network, the difference in total losses for various routes between two nodes can be substantial, leading to otherwise non-optimal use for many quality of service (QOS) criteria, such as bandwidth and key rates. Providing for dynamic quantum entanglement distribution over an out-of-band quantum signaling network, as described herein, improves overall QoS, enhances network reliability, improves quantum network security (with reduced hacking risk), and increases capacity in an optical fiber network. Operations consolidation can also be effected for different types of "Quantum First" goals (high security and high speed). Furthermore, exemplary embodiments also provide a market differentiator as well as new opportunities for information technology (IT) service providers.

One or more aspects of the subject disclosure include a device, comprising a processing system including a processor, and a memory that stores executable instructions that, when executed by the processing system, facilitate performance of operations. The operations can include receiving artificial intelligence (AI) analytics from a generative AI system. Further, the operations can include based on the AI analytics, causing a software defined network (SDN) controller to identify a signaling path over a quantum signaling network, thereby enabling selection of a determined suitable path for quantum entanglement distribution.

One or more aspects of the subject disclosure include a non-transitory machine-readable medium, comprising executable instructions that, when executed by a processing system including a processor, facilitate performance of operations. The operations can include receiving a command from a software defined network (SDN) controller to effect quantum entanglement distribution, wherein the command is generated based on an analysis of telemetry data associated with a network, and wherein the command identifies a signaling path over a fiber channel or a satellite channel. Further, the operations can include based on the command, causing an Einstein-Podolsky-Rosen (EPR) generation functionality of a device to generate entanglement between a source node and a destination node.

One or more aspects of the subject disclosure include a method. The method can comprise obtaining, by a processing system including a processor, artificial intelligence (AI) analytics from a generative AI model. Further, the method can include based on the AI analytics, causing, by the processing system, a software defined network (SDN) controller to select a signaling path for quantum entanglement distribution over a quantum network.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, AI and SDN-enabled quantum signaling entanglement distribution. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Exemplary embodiments described herein provide an architecture for quantum entanglement distribution using a generative AI and SDN-enabled quantum signaling network. In the exemplary architecture, multiple quantum devices may be interconnected via optical fiber, satellite, or any other transport mechanism to share quantum data among remote nodes of the quantum signaling network. Given the inherent quantum computation uniqueness, various (e.g., all of the) components may engage in rapid quantum computing, where out-of-band quantum signaling, as described herein, may (by way of the AI-enabled SDN) further enhance the efficiency, security, and reliability of the overall quantum entanglement distribution process. Indeed, as will be understood and appreciated, leveraging generative AI capabilities facilitates more accurate and predictable selection of the best or most suitable signaling path for a given time of day, given day of the week, etc.

Figure 2A:
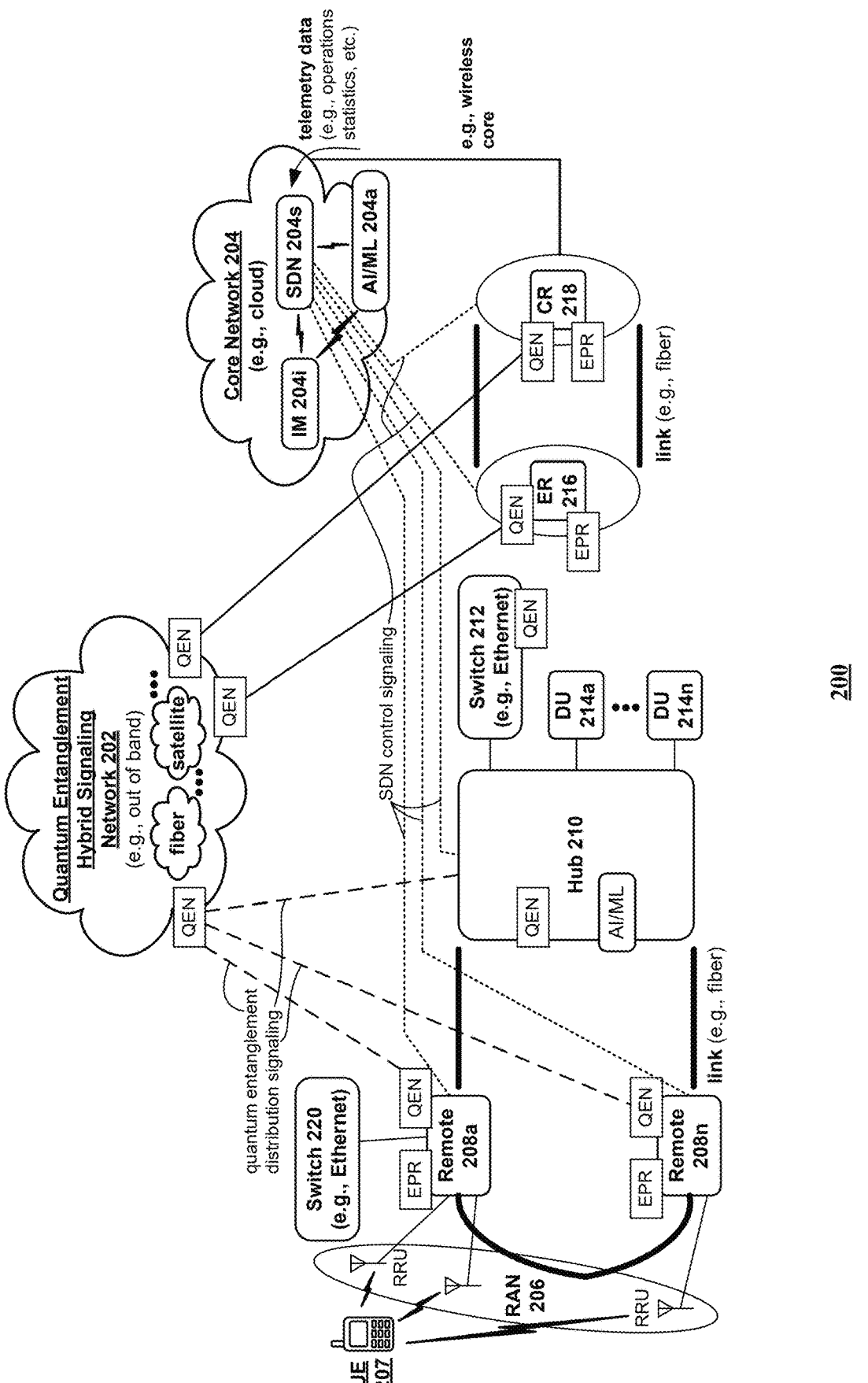
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 functioning within, or operatively overlaid upon, the communications network of FIG. 1 in accordance with various aspects described herein. As shown in FIG. 2A, the system 200 may include a quantum entanglement (e.g., hybrid) signaling network 202, a core network 204, and a radio access network (RAN) 206. In various embodiments, the quantum entanglement network 202 may include multiple QENs, some of which may be distributed among various devices of the network system 200, such as remote nodes 208*a* through 208*n*, a hub 210 (e.g., a propagation device that couples a lower speed RAN with the higher speed core network), a switch 212, an edge router (ER) 216, and/or a core router (CR) 218. A QEN may be implemented in a quantum computing device. In one or more embodiments, the quantum signaling network 202 may include a network of networks, such as those based on optical fiber, satellite, and/or other transport means, and may facilitate out-of-band quantum entanglement distribution among QENs.

In various embodiments, the core network 204 may include various network devices and/or systems that provide a variety of functions. Examples of functions provided by, or included, in the core network 204 include an access mobility and management function (AMF) configured to facilitate mobility management in a control plane of the network system 200, a user plane function (UPF) configured to provide access to a data network, such as a packet data network (PDN), in a user (or data) plane of the network system 200, a Unified Data Management (UDM) function, a Session Management Function (SMF), a policy control function (PCF), and/or the like. The core network 204 may be in communication with one or more other networks (e.g., one or more content delivery networks (CDNs)), one or more services, and/or one or more devices. In one or more embodiments, the core network 204 may include one or more devices implementing other functions, such as a master user database server device for network access management, a PDN gateway server device for facilitating access to a PDN, and/or the like. The core network 204 may include various physical/virtual resources, including server devices, virtual environments, databases, and so on.

An SDN controller 204*s* of an SDN may allow the network system 200 to separate control plane operations from data plane operations, and can enable layer abstraction for separating service and network functions or elements from physical network functions or elements. In one or more embodiments, the SDN controller 204*s* may coordinate networking and provisioning of applications and/or services. The SDN controller 204*s* may manage transport functions for various layers within the network system 200, and can access application functions for layers above the network system 200. The SDN controller 204*s* may provide a platform for network services, network control of service instantiation and management, as well as a programmable environment for resource and traffic management. The SDN controller 204*s* may also permit a combination of real-time data from the service and network elements with real-time, or near real-time, control of a forwarding plane. In various embodiments, the SDN controller 204*s* may enable flow set up in real-time, network programmability, extensibility, standard interfaces, and/or multi-vendor support.

In various embodiments, the system 200 may include multiple SDN controllers 204*s* (e.g., one or more for a front-haul link of the network, one or more for a back-haul link, etc.). In one or more embodiments, the SDN controller 204*s* may be implemented using open source software (e.g., an application programming interface (API) written based on Python or the like) configured to manage network flows. In certain embodiments, the SDN controller 204*s* may leverage an operating system (OS) (e.g., a 5G-EmPOWER OS providing OpenEmPOWER protocol or the like) configured to manage multiple heterogenous RANs and that provides management functions/services.

In exemplary embodiments, an AI/ML system 204*a* may, either on its own or interact with the SDN controller 204*s*, to obtain data regarding the network (e.g., radio/wireline) environment in real-time or near real-time. The AI/ML system 204*a* may utilize ML model(s) to analyze the data so as to monitor and ascertain the real-time or near real-time conditions of the core network 204, the RAN 206, the quantum signaling network 202, and/or the radio/wireline environment. The data may include counter values, key capacity indicator (KCI) values, key performance indicator (KPI) values, thresholds, alarm information, and/or the like relating to the core network 204, the RAN 206, the quantum signaling network 202, the radio link resources, the wireline resources, and/or network traffic associated with these network segments.

In one or more embodiments, the AI/ML system 204*a* may be capable of performing aggregation and advanced analysis (e.g., in a unified manner) of all available network/radio/wireline data from the SDN controller 204*s* as well as from various elements of the overall network throughout the different network segments. Such aggregation and analysis may be performed in a streaming mode (e.g., in real-time or near real-time) and/or in a batch mode (e.g., in non-real-time).

In exemplary embodiments, the AI/ML system 204*a* may derive outputs from one or more analyses and output or feed information to an IM platform 204*i*. In some embodiments, the AI/ML system 204*a* may provide all model outputs to the IM platform 204*i*. The information/model outputs may include data relating to intra-slicing (or slices within a network segment), such as information regarding available bandwidth. The information/model outputs may additionally, or alternatively, include data relating to inter-slicing (slicing between network segments), such as information regarding system (e.g., server, virtual machine, or resource) failures or non-optimal system performance (e.g., performance below certain threshold(s)). In exemplary embodiments, the AI/ML system 204*a* may perform trend analysis and/or global counter/KCI/KPI value comparisons (e.g., with threshold(s)) to proactively detect/diagnose, isolate, and address/fix network issues at a global level (across network segments). In this way, the IM platform 204*i* may be capable of identifying the root cause of an issue in a timely manner based on AI analytics.

In various embodiments, the AI/ML system 204*a* may be configured to reduce any error in the derivations/predictions of outputs, appropriate action(s) to take, and so on. In this way, any error that may be present may be provided as feedback to the algorithm(s), such that the error may tend to converge toward zero as the algorithm(s) are utilized more and more.

The system 200 can provide services to various types of user equipment (UEs) (e.g., UE 207). Examples of UEs include mobile devices 124, display and television devices, home and business networks, IoT devices, video and audio devices, and so on. A UE may be equipped with one or more transmitter (Tx) devices and/or one or more receiver (Rx) devices configured to communicate with, and utilize network resources of, the system 200. UEs may (separately or simultaneously) connect to one or more network slices provided in the network system 200.

In various embodiments, the RAN 206 may include a wireless RAN, a Wi-Fi network, and/or a wireline network. The RAN 206 may include network resources, such as one or more physical access resources and/or one or more virtual access resources. Physical access resources can include base station(s) (e.g., one or more eNodeBs, one or more gNodeBs, or the like), one or more satellites or uncrewed aerial vehicles (UAVs), one or more Gigabyte Passive Optical Networks (GPONs) or related components (e.g., Optical Line Terminal(s) (OLT), Optical Network Unit(s) (ONU), etc.), and/or the like. A base station may employ any suitable radio access technology (RAT), such as LTE, 5G, 6G, or any higher generation RAT. One or more edge computing devices (e.g., Multi-access edge computing (MECs) devices or the like) may also be included in or associated with the RAN 206.

Virtual access resources can include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In one or more embodiments, the RAN 206 may include any number/types of physical/virtual access resources and various types of heterogeneous cell configurations with various quantities of cells and/or types of cells.

In certain embodiments, the RAN 206 may be implemented as a virtual RAN, where radio/wireline functions are implemented as general-purpose applications/apps that operate in virtualized environments and interact with physical resources either directly or via full/partial hardware emulation. Virtualized software radio applications can be delivered as a service and managed through a cloud controller. Here, base stations may be implemented as (e.g., passive) distributed radio elements connected to a centralized baseband processing pool. For instance, although not shown, certain components in FIG. 2A may be included in the RAN 206—e.g., a switch 220, the switch 212, remote nodes 208*a* through 208*n*, the hub 210, distributed units (DUs) 214*a* through 214*n*, and/or the ER 216.

The remote nodes 208*a*, 208*n*, etc. may be computing devices that are each equipped with one or more QENs. In certain embodiments, the remote nodes can operate in peer-to-peer mode with one another. In various embodiments, some or all of the remote nodes may be equipped with EPR generation functionality for generating entanglement signaling (i.e., qubit entanglement generation). As an example, EPR generation functionality of the remote node 208*a* may be triggered (based on quantum entanglement distribution signals from the quantum entanglement network 202) to provide entanglement signaling such that qubits in the QEN of the remote node 208*a* become entangled with qubits in the QEN of remote node 208*n*. In some embodiments, such entanglement distribution may be outsourced to one or more other third-party devices (not shown) in the quantum entanglement network 202 that have EPR generation functionality. In these embodiments, the SDN controller 204*s* may control (e.g., directly or via the quantum entanglement network 202) the third-party device(s) to signal entanglement between two or more remote nodes.

The following is a brief description of a non-limiting, example process for quantum entanglement distribution. First, a UE (e.g., the UE 207) may, at the application level, submit a request for services, such as a voice call service or a data streaming service. The request may be transmitted via the RAN 206 to one of the remote nodes (e.g., remote node 208*a*), which may forward the request to the SDN controller 204*s* either directly or by way of the quantum entanglement network 202. Here, the IM platform 204*i* may "mediate" outputs from the AI/ML system 204*a* with the decision of the SDN controller 204*s* as to which signaling path (e.g., fiber optic, satellite, etc.) should be used for the request. Again, the decision may be based on policies, preset conditions, and/or real-time performance data (e.g., relating to data loss and/or latency). For instance, the decision may be based on signs of eavesdropping, QBER value, information regarding fiber channel damage or connection loss, information regarding compromised or damaged remote nodes, and so on. The SDN controller 204*s* may send its "mediated" decision to the quantum entanglement network 202 (e.g., one of the QENs in the quantum entanglement network 202). The quantum entanglement network 202 may then identify a source remote node and a destination remote node in the decided path, and may instruct an EPR generation functionality of the source remote node to generate entanglement with the destination remote node. In some embodiments, the QEN of the source remote node may cause the EPR generation functionality of the source remote node (in this case, both are collocated in the source remote node) to generate qubit entanglement data, which the source remote node may transmit, via the selected signaling path, to the QEN/EPR generation functionality of the destination remote node to configure the entanglement. In certain alternate embodiments, the quantum entanglement network 202 may instruct the destination remote node to generate entanglement with the source remote node. In some instances, such as where the source remote node (or the destination remote node) lacks EPR generation functionality, the quantum entanglement network 202 may trigger a third-party device (not shown) that has such EPR generation functionality to establish the entanglement between the source remote node and the destination remote node.

In various embodiments, the SDN controller 204*s* may initially determine whether quantum networking for the request is warranted prior to deciding on the signaling path. In these embodiments, the SDN controller 204*s* may make the determination based on one or more factors, such as the amount of data that is to be transmitted, a required speed for data transmission, QoS or service level agreement (SLA) requirements, and/or the like. For instance, where the request is determined to involve a certain amount of data transfer or data transfer at a certain speed, the SDN controller 204*s* may determine that quantum networking is warranted.

In some embodiments, a QEN (such as the QEN in the remote node 208*a*, 208*n*, etc.) may be equipped or configured with one or more routing tables (which may be configured by the SDN controller 204*s*) that the QEN and/or EPR generation functionality may utilize for signaling path routing table lookups. Here, the QEN and/or EPR generation functionality may choose the appropriate route in accordance with the SDN's decided path. It will be understood and appreciated that the lookup table(s) may be updated as needed based on any changes that may be made to the quantum network elements and/or the links therebetween. In various embodiments, the lookup table(s) may also be utilized to "disentangle" remote nodes when quantum connections between the remote nodes are no longer needed so as to release the relevant resources in the quantum network.

In some alternative embodiments, SDN functionality and/or AI/ML functionality may be distributed across various components in the network (e.g., in RAN elements, in the remote nodes, etc.). In such cases, these functionalities may coordinate with one another to decide on the best or most suitable signaling path for entanglement distribution.

It is to be understood and appreciated that, although FIG. 2A might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 2C:
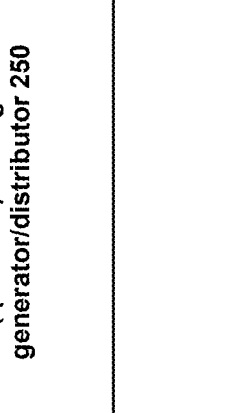
FIG. 2C is a block diagram illustrating an example, non-limiting embodiment of a quantum entanglement generator/distributor in accordance with various aspects described herein.
Figure 2B:
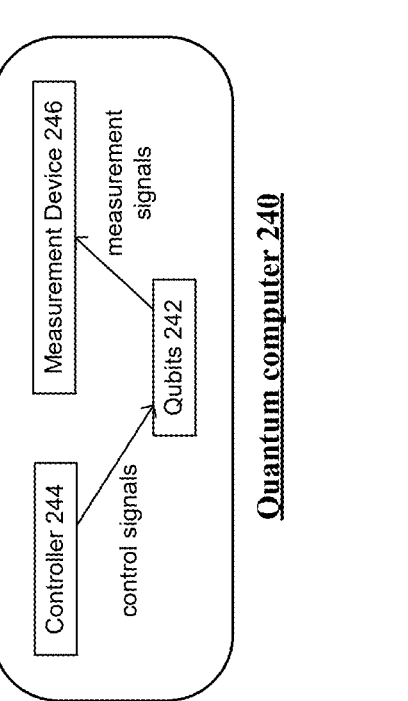
FIG. 2B is a block diagram illustrating an example, non-limiting embodiment of a quantum computer in accordance with various aspects described herein.

FIG. 2B is a block diagram illustrating an example, non-limiting embodiment of a quantum computer or QEN 240 in accordance with various aspects described herein. In various embodiments, the quantum computer 240 may be similar to or correspond to one or more of the QENs described above with respect to FIG. 2A. As shown in FIG. 2B, the quantum computer 240 may include qubits 242 (i.e., any number of desired qubits). The qubits 242 may be implemented in one of a variety of forms, such as, for example, photons, charge- or flux-type qubits, superconducting circuits, trapped ions, molecules in solid or liquid form, nitrogen vacancy centers, semiconductor materials, and so on.

Although not shown, the quantum computer 240 may include gates (i.e., any number of gates) in a quantum circuit. A gate (or quantum gate) refers to the use of a gate control signal to cause one or more qubits 242 to undergo a physical transformation (e.g., a single qubit rotation, two qubit entanglement, a multi-qubit operation, etc.)—essentially to effect a logical gate operation. In certain embodiments, the number of gates may be proportional to the number of qubits 242 in the quantum computer 240. In some embodiments, the gate depth may be less than or equal to the number of qubits 242 in the quantum computer 240 or less than or equal to a linear multiple of the number of qubits 242 in the quantum computer 240. In various embodiments, the qubits 242 may be interconnected in a graph pattern, such as a linear pattern, a two-dimensional grid, a three-dimensional grid, an all-to-all network, or a combination thereof.

As shown, the quantum computer 240 may be equipped with a controller 244 and a measurement device 246. The controller 244 may include various classical circuit components, and may generate and output control signals to the qubits 242. The measurement device 246 may obtain measurement signals from the qubits 242 that represent the states of the qubits 242. The control signals may include electrical signals, magnetic signals, optical signals, or a combination thereof and the measurement signals may include photons, voltages, radio frequency (RF) fields, RF signals, microwave signals, or a combination thereof, all depending on how the qubits 242 are implemented. As an example, in a case where the qubits 242 are implemented as photons, the controller 244 may be constructed as a beam splitter (such as a heater or mirror), the control signals may control the beam splitter, the measurement device 246 may be a photodetector, and the measurement signals may be photons.

In one or more embodiments, the controller 244 may provide state preparation control signals to change the states of some or all of the qubits 242. In various embodiments, the controller 244 may provide gate control signals. The measurement device 246 may perform one or more measurement operations on the qubits 242 to "read out" measurement signal(s). Qubit control and readout may be repeated as necessary. In some embodiments, the measurement device 246 may provide feedback to the controller 244. It will be understood and appreciated that the quantum computer 240 may additionally include other components, such as classical (non-quantum) components that do not operate in accordance with quantum mechanics.

FIG. 2C is a block diagram illustrating an example, non-limiting embodiment of a quantum entanglement generator/distributor 250 in accordance with various aspects described herein. In various embodiments, the quantum entanglement generator/distributor 250 may be similar to or correspond to one or more of the EPRs described above with respect to FIG. 2A. In one or more embodiments, the quantum entanglement generator/distributor 250 may be composed of various components, such as laser(s), switch (es), filter(s), guide(s), detector(s), analyzer(s), and others, that are integrated and designed to facilitate quantum entanglement generation/distribution. For instance, the quantum entanglement generator/distributor 250 may be a Bell state generator or a more advanced generator that can entangle two or more qubits.

While various components, devices, systems, nodes, switches, etc. may have been illustrated in each of FIGS. 2A-2C as separate components, devices, systems, nodes, switches, etc., it will be appreciated that multiple components, devices, systems, nodes, switches, etc. can be implemented as a single component, device, system, node, switch, etc., or a single component, device, system, node, switch, etc. can be implemented as multiple components, devices, systems, nodes, switches, etc. Additionally, functions described as being performed by one component, device, system, node, switch, etc. may be performed by multiple components, devices, systems, nodes, switches, etc., or functions described as being performed by multiple components, devices, systems, nodes, switches, etc. may be performed by a single component, device, system, node, switch, etc.

Figure 2D:
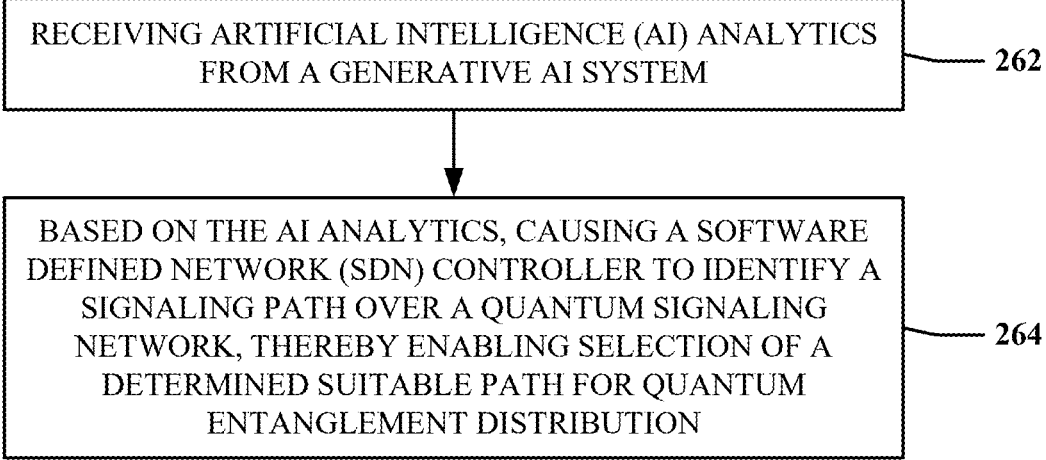
FIG. 2D depicts an illustrative embodiment of a method in accordance with various aspects described herein.

FIG. 2D depicts an illustrative embodiment of a method 260 in accordance with various aspects described herein. In some embodiments, one or more process blocks of FIG. 2D can be performed by an intelligent mediation device, such as the IM platform 204i. In some embodiments, one or more process blocks of FIG. 2D may be performed by another device or a group of devices separate from or including the IM platform 204i, such as the SDN controller 204s and/or the AI/ML system 204a.

At 262, the method can include receiving artificial intelligence (AI) analytics from a generative AI system. For example, the IM platform 204i can, similar to that described above with respect to the system 200 of FIG. 2A, perform one or more operations that include receiving artificial intelligence (AI) analytics from a generative AI system.

At 264, the method can include based on the AI analytics, causing a software defined network (SDN) controller to identify a signaling path over a quantum signaling network, thereby enabling selection of a determined suitable path for quantum entanglement distribution. For example, the IM platform 204i can, similar to that described above with respect to the system 200 of FIG. 2A, perform one or more operations that include based on the AI analytics, causing a software defined network (SDN) controller to identify a signaling path over a quantum signaling network, thereby enabling selection of a determined suitable path for quantum entanglement distribution.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
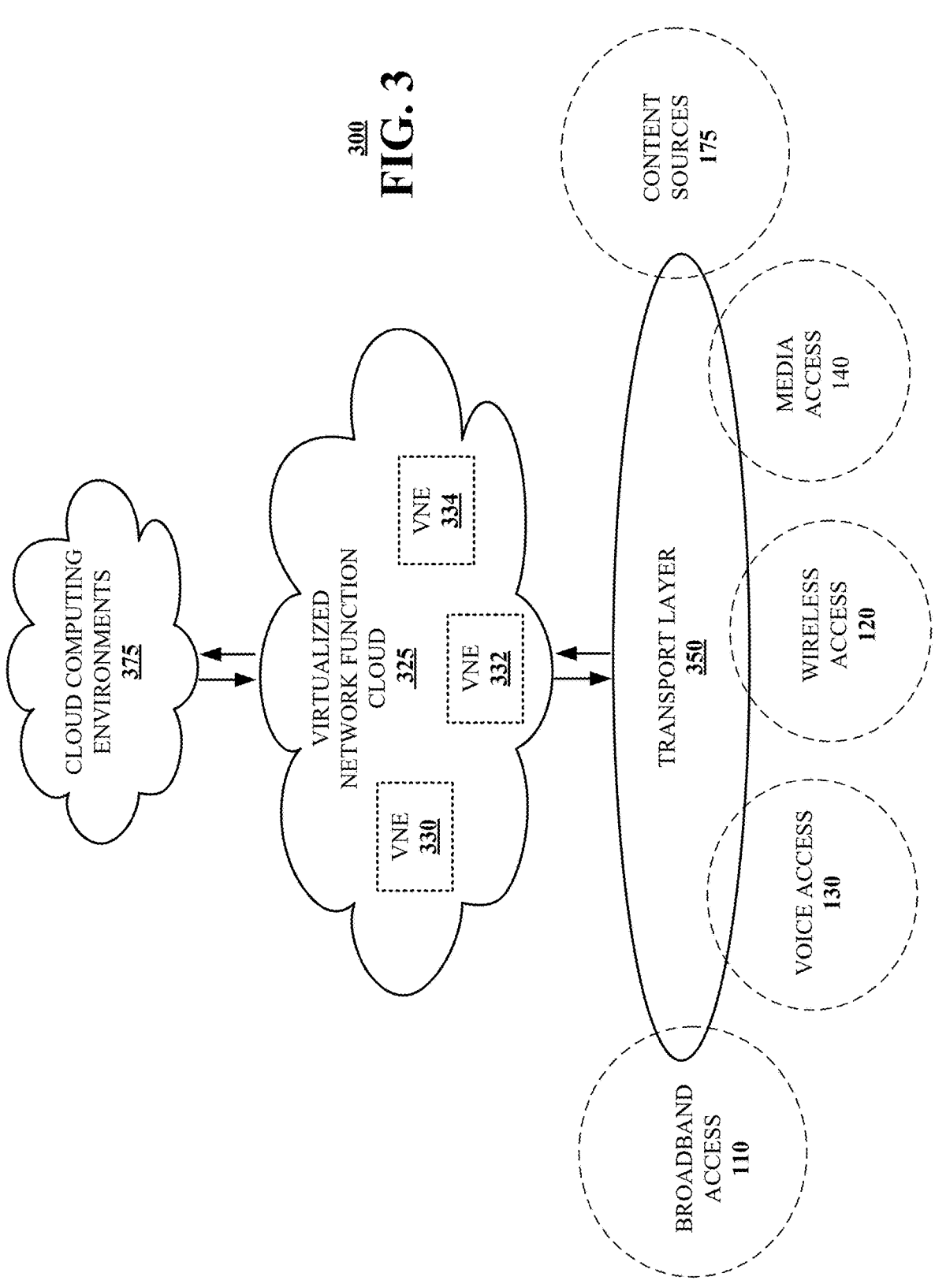
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of systems/devices 200, 240, and 250, and method 260 presented in FIGS. 1 and 2A-2D. For example, virtualized communications network 300 can facilitate, in whole or in part, AI and SDN-enabled quantum signaling entanglement distribution.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
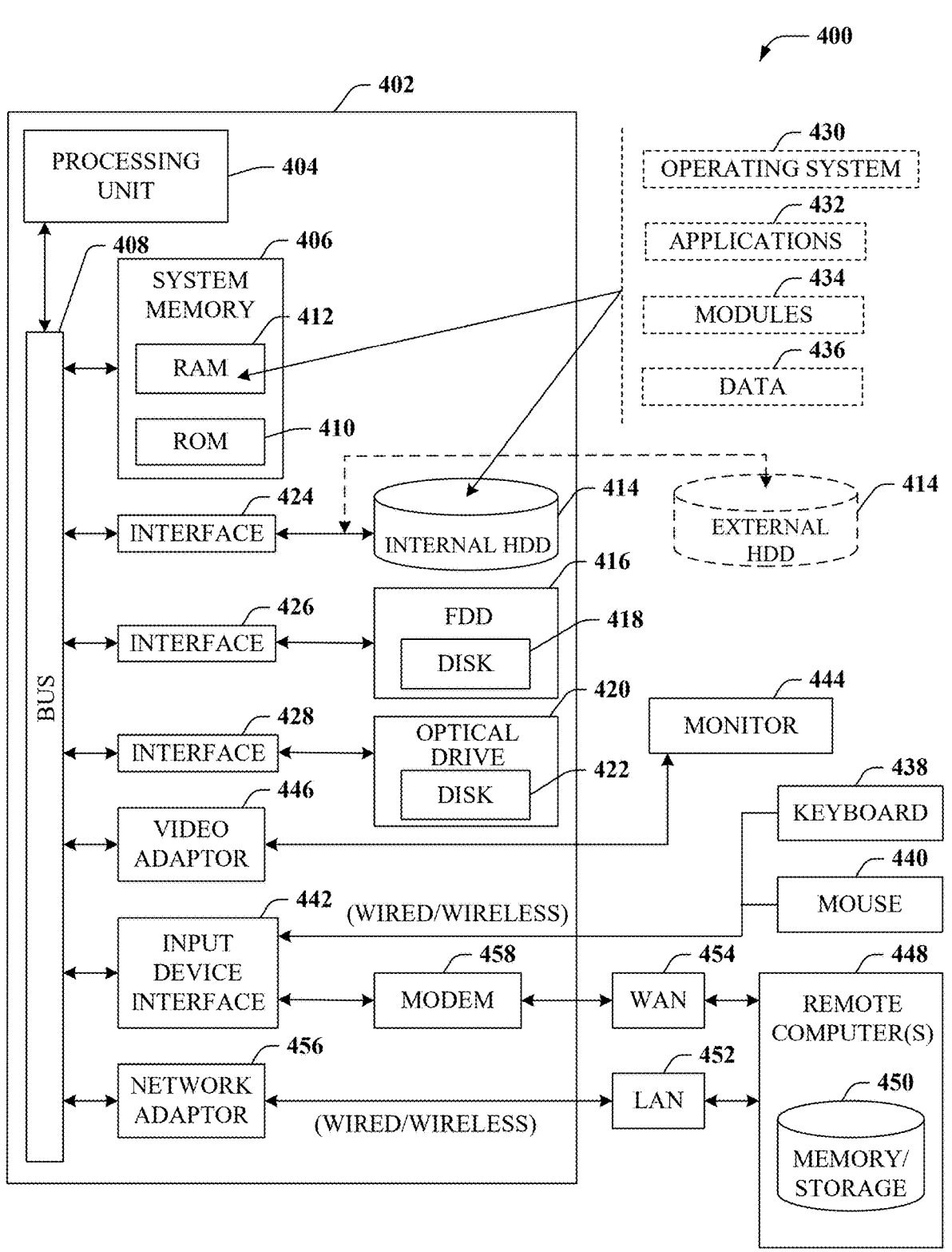
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, AI and SDN-enabled quantum signaling entanglement distribution.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device

450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
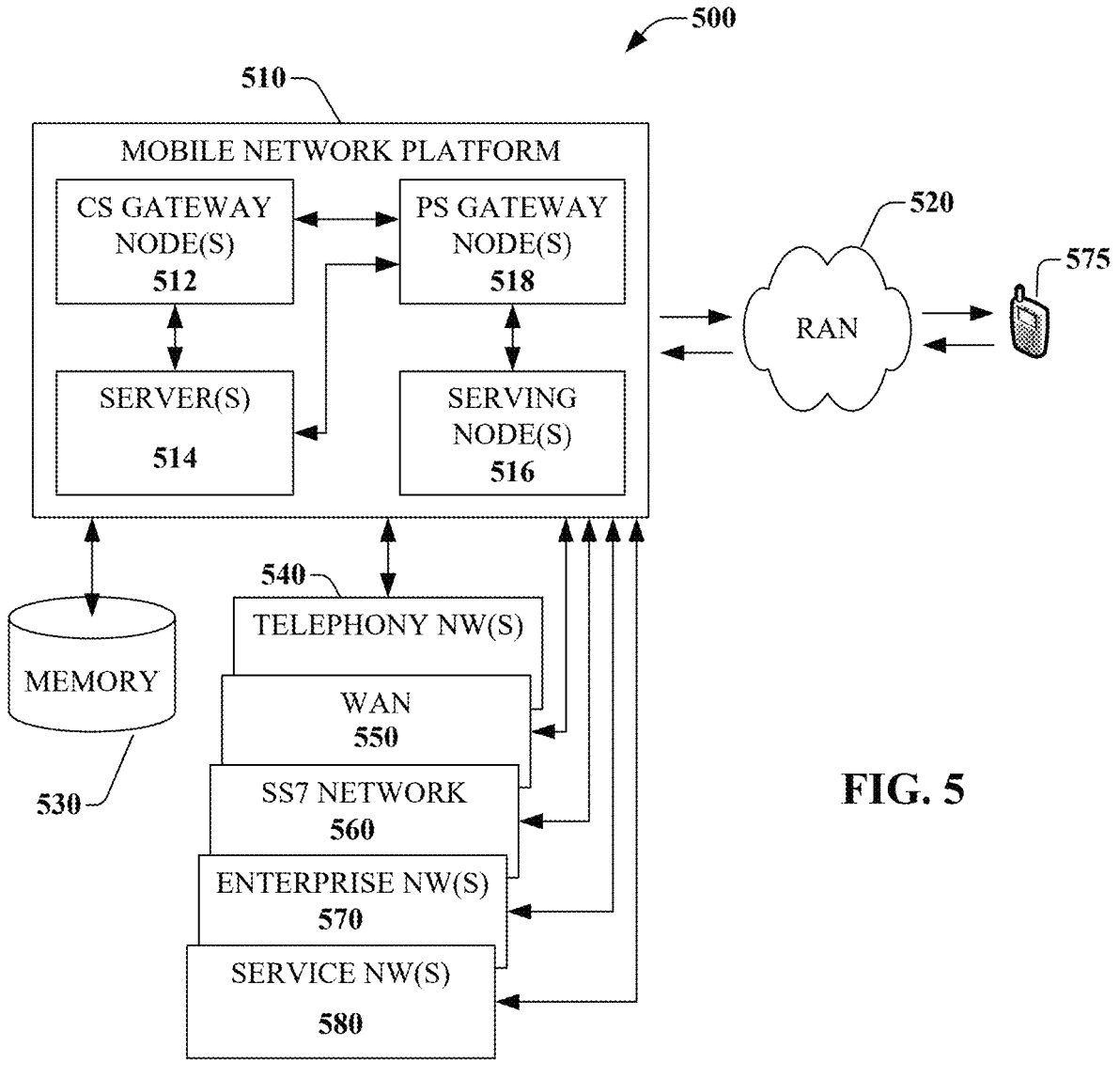
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, AI and SDN-enabled quantum signaling entanglement distribution. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecom-munication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specifica-tion(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discus-sion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
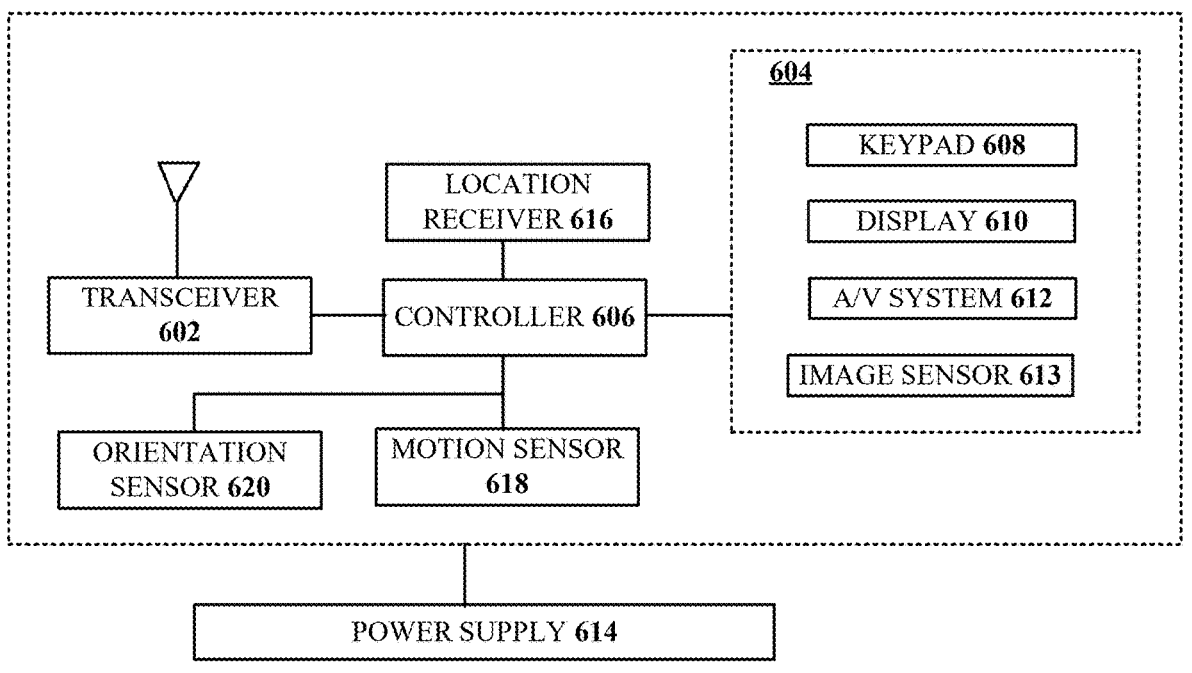
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, AI and SDN-enabled quantum signaling entanglement distribution.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wire-less access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication tech-nologies as they arise. The transceiver 602 can also be adapted to support circuit-switched wireline access tech-nologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipu-lating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emit-ting Diode) or other suitable display technology for convey-ing images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free opera-tion). The audio system 612 can further include a micro-phone for receiving audible signals of an end user. The audio system 612 can also be used for voice recognition applica-tions. The UI 604 can further include an image sensor 613 such as a charged coupled device (CCD) camera for cap-turing still or moving images.

The power supply 614 can utilize common power man-agement technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communi-cation device 600 based on signals generated by a constel-lation of GPS satellites, which can be used for facilitating location services such as navigation. The motion sensor 618 can utilize motion sensing technology such as an acceler-ometer, a gyroscope, or other suitable motion sensing tech-nology to detect motion of the communication device 600 in three-dimensional space. The orientation sensor 620 can utilize orientation sensing technology such as a magnetom-eter to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, $X=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving artificial intelligence (AI) analytics from a generative AI system, wherein the AI analytics relate to telemetry data regarding components of a quantum network, one or more links that communicatively couple the components, one or more identified trends analysis or patterns, or a combination thereof; and
based on the AI analytics, causing a software defined network (SDN) controller to identify a determined suitable signaling path over a quantum signaling network for quantum entanglement distribution, wherein the causing is further based on one or more pre-defined policies, one or more preset conditions, real-time network performance data relating to data loss, latency, or both, or a combination thereof, wherein signaling for the quantum entanglement distribution is performed out-of-band relative to data communications, wherein the quantum signaling network comprises a plurality of remote nodes, and wherein at least one of the plurality of remote nodes includes a quantum entanglement node (QEN), Einstein-Podolsky-Rosen (EPR) generation functionality, or a combination thereof.

2. The device of claim 1, wherein the determined suitable signaling path is associated with a first source node of the plurality of remote nodes and a second destination node of the plurality of remote nodes.

3. The device of claim 1, wherein the determined suitable signaling path is over a fiber optic channel.

4. The device of claim 1, wherein the determined suitable signaling path is over a satellite channel.

5. The device of claim 1, wherein the SDN controller instructs a QEN in the quantum signaling network to use the determined suitable signaling path for the quantum entanglement distribution.

6. The device of claim 1, wherein the determined suitable signaling path relates to an application level request submitted by a user equipment.

7. The device of claim 1, wherein the device is an intelligent mediation (IM) platform that resolves a path selection decision of the SDN controller based on the AI analytics.

8. The device of claim 1, wherein the device, the generative AI system, and the SDN controller are implemented in a core network.

9. A method, comprising:
obtaining, by a processing system including a processor, artificial intelligence (AI) analytics from a generative AI model, wherein the AI analytics relate to telemetry data regarding components of a quantum network, one or more links that communicatively couple the components, one or more identified trends analysis or patterns, or a combination thereof; and
based on the AI analytics, causing, by the processing system, a software defined network (SDN) controller to select a determined suitable signaling path for quantum entanglement distribution over a quantum signaling network, wherein the causing is further based on one or more pre-defined policies, one or more preset conditions, real-time network performance data relating to data loss, latency, or both, or a combination thereof, wherein signaling for the quantum entanglement distribution is performed out-of-band relative to data communications, wherein the quantum signaling network comprises a plurality of remote nodes, and wherein at least one of the plurality of remote nodes includes a quantum entanglement node (QEN), Einstein-Podolsky-Rosen (EPR) generation functionality, or a combination thereof.

10. The method of claim 9, wherein the determined suitable signaling path is over a fiber optic channel or a satellite channel.

11. The method of claim 9, wherein the SDN controller instructs the quantum signaling network to use the determined suitable signaling path for the quantum entanglement distribution.

12. The method of claim 11, wherein the quantum signaling network is a hybrid network that includes fiber links that communicatively couple QENs and satellite links that communicatively couple the QENs.

13. A non-transitory machine-readable medium, comprising executable instructions that, when executed by a processing system including a processor, facilitate performance of operations, the operations comprising:

receiving artificial intelligence (AI) analytics from a generative AI system, wherein the AI analytics relate to telemetry data regarding components of a quantum network, one or more links that communicatively couple the components, one or more identified trends analysis or patterns, or a combination thereof; and based on the AI analytics, causing a software defined network (SDN) controller to identify a determined suitable signaling path over a quantum signaling network for quantum entanglement distribution, wherein the causing is further based on one or more pre-defined policies, one or more preset conditions, real-time network performance data relating to data loss, latency, or both, or a combination thereof, wherein signaling for the quantum entanglement distribution is performed out-of-band relative to data communications, wherein the quantum signaling network comprises a plurality of remote nodes, and wherein at least one of the plurality of remote nodes includes a quantum entanglement node (QEN), Einstein-Podolsky-Rosen (EPR) generation functionality, or a combination thereof.

14. The non-transitory machine-readable medium of claim 13, wherein the determined suitable signaling path is associated with a first source node of the plurality of remote nodes and a second destination node of the plurality of remote nodes.

15. The non-transitory machine-readable medium of claim 13, wherein the determined suitable signaling path is over a fiber optic channel.

16. The non-transitory machine-readable medium of claim 13, wherein the determined suitable signaling path is over a satellite channel.

17. The non-transitory machine-readable medium of claim 13, wherein the SDN controller instructs a QEN in the quantum signaling network to use the determined suitable signaling path for the quantum entanglement distribution.

18. The non-transitory machine-readable medium of claim 13, wherein the determined suitable signaling path relates to an application level request submitted by a user equipment.

19. The non-transitory machine-readable medium of claim 13, wherein the processing system comprises an intelligent mediation (IM) platform that resolves a path selection decision of the SDN controller based on the AI analytics.

20. The non-transitory machine-readable medium of claim 13, wherein the processing system, the generative AI system, and the SDN controller are implemented in a core network.

* * * * *